Jan. 26, 1937. H. A. STEVENSON 2,068,825
INDUSTRIAL TRUCK
Filed May 25, 1935 2 Sheets-Sheet 1
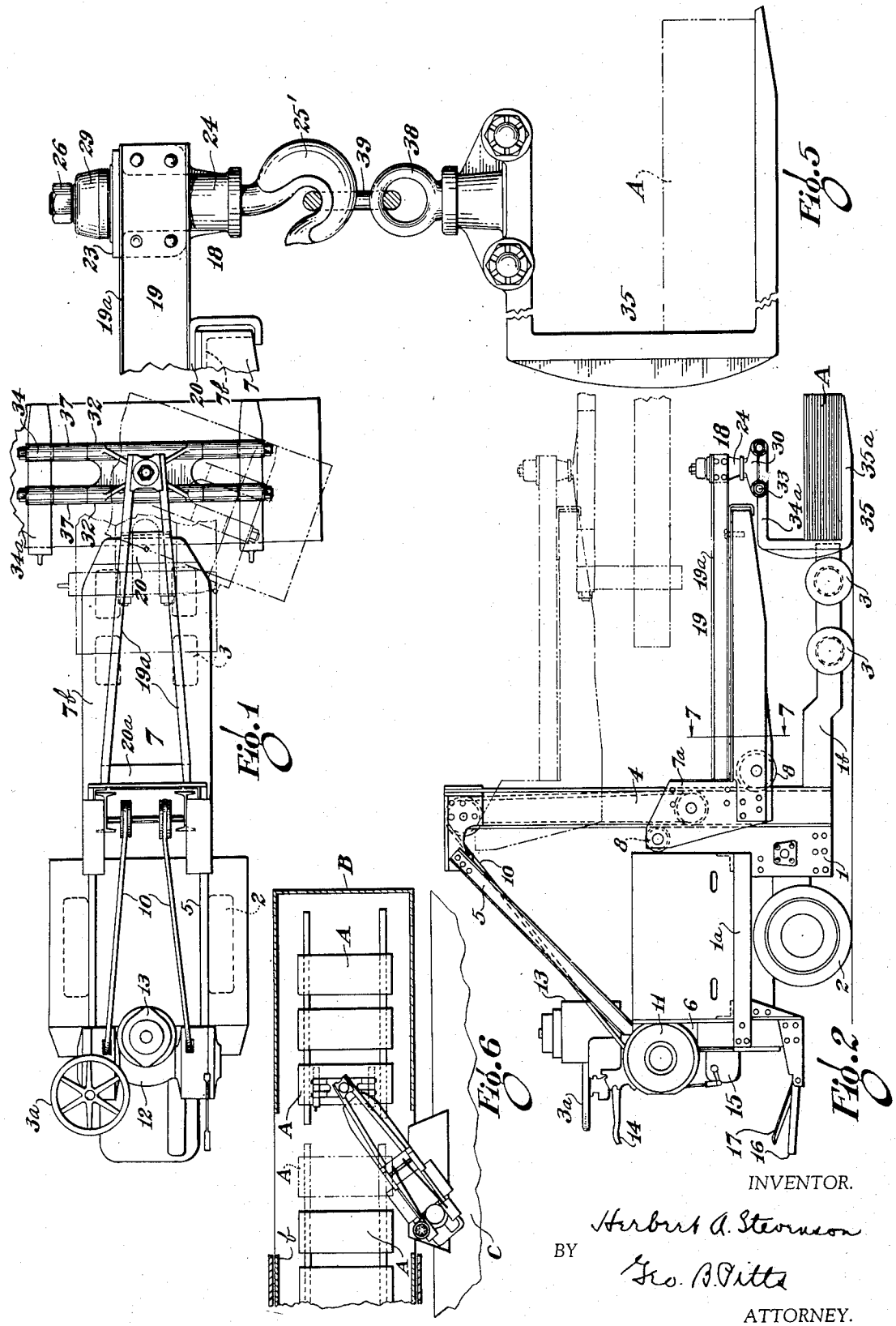
INVENTOR.
Herbert A. Stevenson
BY
Geo. B. Pitts
ATTORNEY.

Jan. 26, 1937.   H. A. STEVENSON   2,068,825
INDUSTRIAL TRUCK
Filed May 25, 1935   2 Sheets-Sheet 2
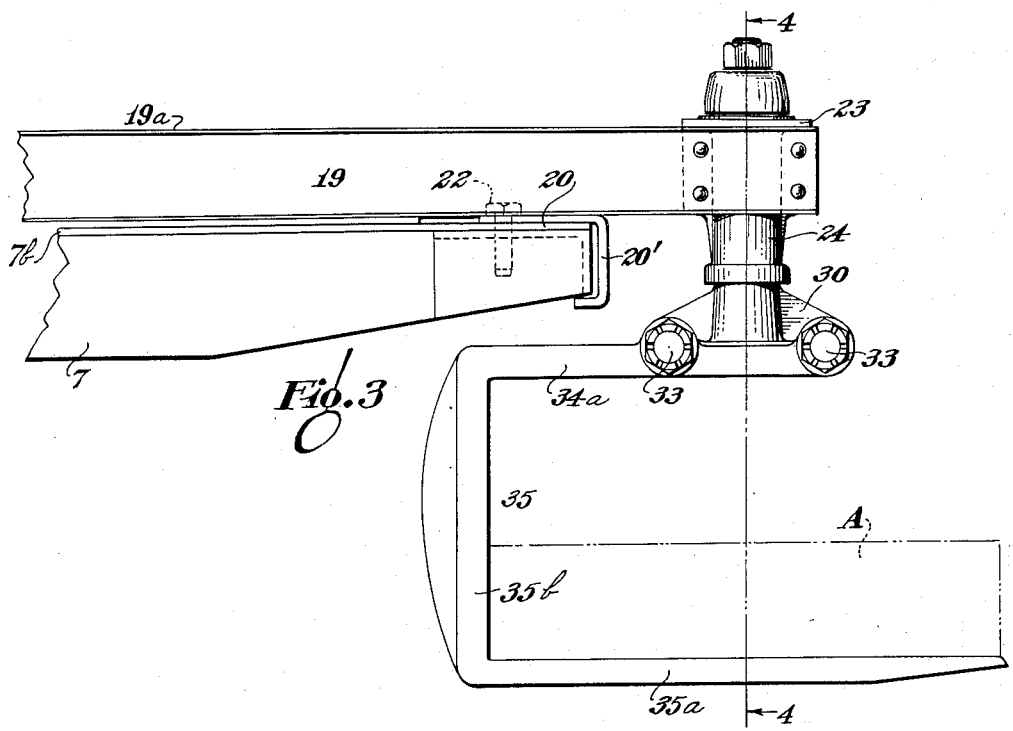
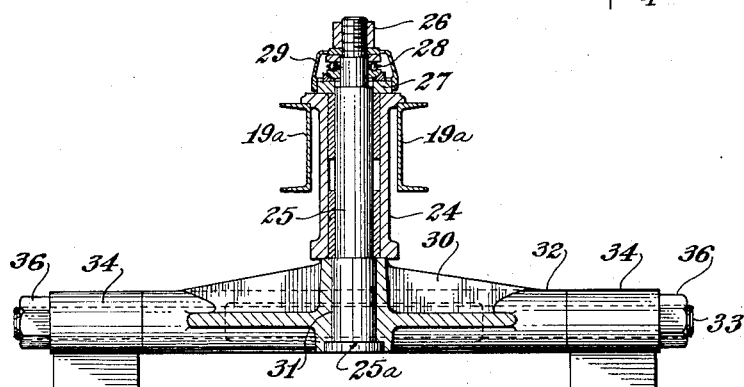
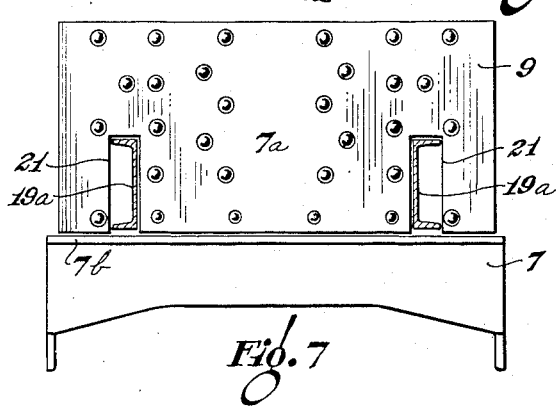
INVENTOR.
Herbert A. Stevenson
BY Geo. B. Pitts
ATTORNEY.

Patented Jan. 26, 1937

2,068,825

UNITED STATES PATENT OFFICE 2,068,825

INDUSTRIAL TRUCK

Herbert A. Stevenson, Mount Clemens, Mich., assignor to The Baker-Raulang Company, Cleveland, Ohio, a corporation of Ohio Application May 25, 1935, Serial No. 23,476

6 Claims. (Cl. 214—65)

This invention relates to an industrial truck constructed to rapidly and economically carry out various operations of handling loads and transporting them.

One object of the invention is to provide an industrial truck having an improved means for engaging, lifting and moving loads, whereby the range of operations of the truck is materially and advantageously increased.

In the use of industrial trucks having lifting members many conditions arise where the truck cannot engage a load and lift it or lower and discharge the load in the position or location desired, on account of the length of the truck and because it must be driven forwardly and backwardly in a substantially longitudinal direction, to effect engagement of the lift member under the load. For example, in shipments of large or heavy packs of sheet steel it is desirable to load the freight car to full capacity; that is, to use its entire floor area, except for necessary clearance to secure the packs in position. Conditions of this kind have heretofore, so far as I have knowledge, been overcome by employing trucks of the type shown in Letters Patent Nos. 1,870,689 and 1,870,690, granted to E. H. Remde, of Cleveland, Ohio or by other special equipment. This special equipment was useless for other load handling operations and trucks of the type mentioned have not been found practical for more general plant operations. Accordingly, another object of my invention is to provide an improved truck having a lift member and removable equipment thereon adapted to engage loads located in positions normally inaccessible to the lift member or to discharge the load in such positions.

Other objects of the invention will be apparent to those skilled in the art to which my invention relates from the following description taken in connection with the accompanying drawings, wherein Fig. 1 is a plan view of a truck embodying my invention.

Fig. 2 is a side elevation.

Fig. 3 is a fragmentary view, enlarged.

Fig. 4 is a section on the line 4—4 of Fig. 3.

Fig. 5 is a view similar to Fig. 4, but showing a modification.

Fig. 6 is a diagrammatic view showing one operation for which the truck is adapted.

Fig. 7 is a section on the line 7—7 of Fig. 2, enlarged.

In the drawings, 1 indicates generally the truck frame having an elevated rear section 1a and a low load carrying or front section 1b. The frame is suitably mounted on rear driven wheels 2 and front trailing wheels 3. Either the front or the rear wheels or all of the wheels may be steerably mounted as desired, such steering being effected by a suitable device, for example, a wheel 3a. The frame 1 includes upright spaced guides 4, which are preferably rigidly secured thereto; the guides 4 in this arrangement being braced by tie-bars 5 connected to uprights 6 (only one being shown) at the rear end of the section 1a. The section 1a supports a power means, for example, electric batteries, for supplying current to a motor (not shown) for driving the wheels 2.

7 indicates a lift member having at its inner end a guide member 7a, provided with pairs of rolls 8, which engage the guides 4 to slidably support the lift member 7 thereon, whereby it may be raised (see dotted lines in Fig. 2) and lowered. The guide section 7a is provided outwardly of the guides 4 with an upright transverse plate 9, one purpose of which is to form a back to prevent the loads, when engaged for lifting and transportation, from engaging the guides 4. The lift member extends over the load section 1b and preferably outwardly therebeyond and is provided with a platform 7b for engaging and carrying loads. In the illustrated form of construction the supporting rolls 8 engage the outer opposite sides of the guides. The lift member 7 may be raised and lowered by any suitable hoist mechanism, that shown comprising a pair of flexible cables 10 running over guide wheels or rolls mounted at the upper ends of the guides 4 and on the guide section 7a, the outer ends of the cables being suitably anchored to a member fixed to the upper end of the guides 4. The opposite ends of the cables 10 wind on and off suitable drums enclosed in casings 11, the drums being driven by a suitable power mechanism within a housing 12 and such mechanism in turn being driven by an electric motor 13. The motor 13 is supplied with current from the batteries. The casings 11 and housing 12 are supported on the uprights 6. The motor for driving the wheels 2 is controlled by a lever 14 operatively connected to a controller in a case 15. The motor 13 is controlled by a suitable switch suitably located for operation by the driver.

16 indicates a platform for the driver to stand on. 17 indicates a pedal connected to a brake, which is normally spring operated as is usual in trucks of this type, the brake being released when the pedal is pushed downwardly.

18 indicates as an entirety a carrier removably mounted on the lift member 7. Of the carrier 18, 19 indicates a hanger adapted to rest on and be removably fixed to the lift member and centrally thereof.

The hanger preferably comprises two channel members 19a, 19a, and a connector 20 suitably fixed to the channel members near their outer ends and detachably connected to the lift member 7, as later set forth. The members 19a may be arranged in converging relation, with their inner end portions resting on a plate 20a at the rear end of the platform 7b. The inner free ends of the members 19a removably extend into openings 21 formed in the plate or wall 9 and engage the walls of the openings, which walls cooperate with the connector 20 and the detachable connections therefor to secure the hanger in position. The connector 20 consists of a transverse plate having an extension 20′ bent downwardly and inwardly so as to engage the outer end of the lift member 7 and limit the inward movement of the hanger when positioned. The connector 20 is preferably secured to the lift member 7 by a bolt 22 which engages a threaded opening formed in the platform 7b. 23 indicates a casting suitably secured to and between the outer ends of the members 19a and shaped to form a sleeve 24 through which extends a shaft 25, bushings being provided within the sleeve 24 to form a suitable bearing for the shaft. The upper end of the shaft is threaded to take a nut 26 and between the nut and a collar 27 engaging the upper end of the sleeve 24 is a suitable thrust bearing 28. 29 is an inverted cup member which serves as a washer between the nut 26 and adjacent bearing race and as an enclosure for the bearing 28.

30 indicates a support formed with an opening 31 to receive the lower end of the shaft 25, the latter being provided on its lower end with an enlarged head or collar 25a which engages the support 30 to support it on the shaft 25. The support 30 is shaped to provide along its opposite sides parallel sleeve members 32 through which rods 33 extend and project from either side of the sleeve members 32. The projecting ends of the rods 33 extend through suitable knuckles 34 provided on the arms 34a of a cradle 35. The arms 34a are secured to the rods 33 by nuts 36 threaded on the free ends thereof. The nuts 36 clamp the knuckles 34 against the outer ends of the sleeve members 32, as shown in Fig. 4 or against interposed spacers 37 (see Fig. 1), where it is desired to increase the space between the cradle members, to accommodate loads of different widths. In this latter arrangement rods 33 of the necessary length are utilized. The cradle 35 preferably comprises two U-members of similar shape each consisting of a load carrying arm 35a, an intermediate upright section 35b and the arm 34a; the arms 35a project beyond the connection of the arms 34a with the shaft 25 so that when a load A is engaged, its center of gravity is substantially coincident with the axis of the shaft 25, as will be understood from Figs. 2 and 3. As will be understood from the foregoing description, the cradle 35 may be rotated in either direction about the axis of the shaft 25 so that its arms 35a may be projected below a load disposed at one side of the lift member 7 or discharge a load at such position, as shown in Fig. 1. In connection with the loading or unloading of a freight car B adjacent a dock C, the loads A adjacent the car doors b may be handled by driving the truck partially into the car, then by swinging or rotating the cradle 35 into a position at substantially right angles to the load and driving the truck forwardly along the arc of a circle, the load may be engaged, lifted and removed in a ready manner, as shown in Fig. 6.

Where the load is unduly wide transversely of the lift member 7, the cradle may be rotated to dispose the load longitudinally of the lift member 7. This permits the truck, when transporting such a load, to be driven through narrow aisles and doorways in a ready manner.

Fig. 5 illustrates a modified form of construction in which the connection between the cradle support 30 and shaft 25 is (a) flexible or articulatable to permit of lateral and vertical movement of the cradle relative to the hanger 19, whereby the cradle may be adjusted without shifting the truck or moving the lift member to properly engage the load, and (b) detachable to permit the cradle to be manually positioned below a load. For example, if a load is positioned between the doors b (as shown in dotted lines in Fig. 6), the cradle may be detached and positioned below the load and thereafter the truck driven in a direction endwise of the load to permit the cradle to be connected to the hanger. In this form of construction, the shaft 25 terminates at its lower end in a hook 25′ and the support 30 is provided with a ring or eye 38 to which is connected a link 39 adapted to removably engage the hook 25′.

As the cradle 35 is mounted beyond the outer end of the frame section 1b and may be lowered into engagement with the flooring, it may be used to engage loads mounted on dunnage supported thereon or discharge loads in this position. By removing the carrier, the lift member 7 may be used for more general load handling operations.

To those skilled in the art to which my invention relates, many changes in construction and widely differing embodiments and applications of the invention will suggest themselves without departing from the spirit and scope of the invention. My disclosures and the description herein are purely illustrative and not intended to be in any sense limiting.

What I claim is:

1. In an industrial truck, the combination with a wheel mounted frame, guides thereon, a lift member mounted on said guides and hoist means for said member, of a carrier mounted on said lift member and comprising a hanger extending outwardly beyond the outer end of said lift member, a shaft depending from said hanger beyond said lift member, and a cradle suspended from said shaft, said cradle consisting of a horizontal rod rotatably mounted intermediate its ends on said shaft and a pair of rigid U-members, corresponding sides of said members being removably mounted on the opposite end portions of said rod and the other sides of said members being adapted to engage a load and support it.

2. In an industrial truck, the combination with a wheel mounted frame, guides thereon, a lift member mounted on said guides and hoist means for said member, of a carrier mounted on said lift member and comprising a hanger extending outwardly beyond the outer end of said lift member, a cradle, and a flexible connection for suspending said cradle from said hanger, said connection permitting said cradle to rotate and including detachable elements to permit said cradle to be detached from said hanger.

3. In an industrial truck, the combination with a wheel mounted frame, guides thereon, a lift member mounted on said guides and hoist means for said member, of a carrier mounted on said lift member and comprising a hanger removably mounted on said lift member and extending outwardly beyond its outer end, a shaft depending from the outer end portion of said hanger and a cradle carried by the lower end of said shaft and rotatable in either direction relative to said lift member, said cradle consisting of a pair of members providing load carrying arms arranged to engage a load.

4. In an industrial truck, the combination with a wheel mounted frame, guides thereon, a lift member mounted on said guides and hoist means for said member, of a carrier mounted on said lift member and comprising a hanger removably mounted on said lift member and extending outwardly beyond its outer end, a shaft depending from the outer end portion of said hanger, a support rotatably mounted on the lower end of said shaft, a cradle consisting of a pair of U-members providing a pair of supporting arms and a pair of load carrying arms, and means for detachably connecting said supporting arms to said support.

5. In an industrial truck, the combination with a wheel mounted frame, guide thereon, a lift member mounted on said guides and hoist means for said member, of a carrier mounted on said lift member and comprising a hanger removably mounted on said lift member and extending outwardly beyond its outer end, a shaft depending from the outer end portion of said hanger, a cradle consisting of a pair of U-members providing supporting arms and load carrying arms arranged to be projected below a load, a support to which said supporting arms are connected and a flexible connection between said support and the lower end of said shaft.

6. In an industrial truck, the combination with a wheel mounted frame, guides thereon, a lift member on said guide and hoist means for said member, of a hanger mounted on said lift member and extending outwardly beyond its outer end, and a U-shaped load carrying device one side of which is suspendedly and rotatably connected to the outer end of said hanger, its opposite side forming a load support adapted to be moved into load lifting relation to a load.

HERBERT A. STEVENSON.